United States Patent
Kozasa et al.

(10) Patent No.: US 9,227,786 B2
(45) Date of Patent: Jan. 5, 2016

(54) PART MOUNTING FACILITY AND PART MOUNTING METHOD

(75) Inventors: Nobuhiro Kozasa, Tochigi (JP);
Katsuyoshi Tsutsumida, Tochigi (JP);
Hidetoshi Takahashi, Tochigi (JP);
Daisuke Hashimoto, Tochigi (JP);
Tomohiro Sugimoto, Tochigi (JP);
Koichi Sano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 14/345,033

(22) PCT Filed: Aug. 28, 2012

(86) PCT No.: PCT/JP2012/071671
§ 371 (c)(1),
(2), (4) Date: May 18, 2014

(87) PCT Pub. No.: WO2013/042511
PCT Pub. Date: Mar. 28, 2013

(65) Prior Publication Data
US 2014/0353116 A1   Dec. 4, 2014

(30) Foreign Application Priority Data
Sep. 19, 2011  (JP) .................. 2011-203986

(51) Int. Cl.
| | | |
|---|---|---|
| *B65G 37/00* | (2006.01) | |
| *B65G 17/20* | (2006.01) | |
| *B62D 65/10* | (2006.01) | |
| *B62D 65/12* | (2006.01) | |
| *B62D 65/18* | (2006.01) | |
| *B65G 17/32* | (2006.01) | |

(52) U.S. Cl.
CPC .............. *B65G 17/20* (2013.01); *B62D 65/10* (2013.01); *B62D 65/12* (2013.01); *B62D 65/18* (2013.01); *B65G 17/32* (2013.01)

(58) Field of Classification Search
CPC .................................... B65G 37/005
USPC .................. 198/346, 346.1, 346.2, 347.1
See application file for complete search history.

(56) References Cited

U.S. PATENT DOCUMENTS

| | | | | |
|---|---|---|---|---|
| 1,408,047 | A | * | 2/1922 | Upp ............................ 29/791 |
| 2,353,638 | A | * | 7/1944 | Beaulieu et al. ......... 198/341.07 |
| 3,889,797 | A | | 6/1975 | Naito et al. |

(Continued)

FOREIGN PATENT DOCUMENTS

| | | |
|---|---|---|
| JP | 48-70261 | 9/1973 |
| JP | 06-206582 | 7/1994 |

(Continued)

*Primary Examiner* — Douglas Hess
(74) *Attorney, Agent, or Firm* — Rankin, Hill & Clark LLP (57) ABSTRACT

A part mounting facility is provided with substantially U-shaped conveyance paths having return bends, and the substantially U-shaped conveyance paths are formed by providing conveyance paths, which are in part mounting work regions, with the return bends. The substantially U-shaped conveyance paths are connected to each other, and the upstream-most substantially U-shaped conveyance path among the connected substantially U-shaped conveyance paths is connected to the downstream-most substantially U-shaped conveyance path to enable a workpiece conveyance dolly to circulate along the conveyance paths.

6 Claims, 6 Drawing Sheets

(56) References Cited

U.S. PATENT DOCUMENTS

| | | | | |
|---|---|---|---|---|
| 4,856,698 A * | 8/1989 | Marianne et al. | ............... | 228/4.1 |
| 5,174,707 A * | 12/1992 | Suekane et al. | ............... | 414/269 |
| 5,374,231 A * | 12/1994 | Obrist | ............................. | 483/15 |
| 6,070,320 A * | 6/2000 | Tomforde et al. | ................ | 29/771 |
| 6,745,102 B1 * | 6/2004 | Liu | ............................... | 700/228 |
| 7,650,982 B2 * | 1/2010 | Tachibana et al. | ........ | 198/341.01 |
| 7,861,392 B2 * | 1/2011 | Hibbler et al. | ................... | 29/429 |
| 2005/0087426 A1 | 4/2005 | Fenzl et al. | | |

FOREIGN PATENT DOCUMENTS

| | | |
|---|---|---|
| JP | 10-254962 | 9/1998 |
| JP | 11-353375 | 12/1999 |
| JP | 2001-075627 | 3/2001 |
| JP | 2002-059321 | 2/2002 |
| JP | 2003-197708 | 7/2003 |
| JP | 2003-251575 | 9/2003 |
| JP | 2005-518952 | 6/2005 |
| JP | 2005-196475 | 7/2005 |
| JP | 2009-292323 | 12/2009 |

\* cited by examiner

FIG.7

PART MOUNTING FACILITY AND PART MOUNTING METHOD

TECHNICAL FIELD

The present invention relates to a part mounting facility and a part mounting method wherein parts are mounted on a workpiece set on a workpiece conveyance dolly while the dolly travels along a conveyance path.

BACKGROUND ART

Some of part mounting facilities are known as implementing an assembly method to complete a single assembly or product (hereinafter referred to as "workpiece" by a particular number (a single or plural) of human operators during one cycle of operation (i.e., cell production system), as disclosed, for example, in Patent Document 1. According to such part mounting facilities, the particular number of human operators moves along with the workpiece and complete a part mounting operation while the workpiece moves over one-cycle distance.

However, the part mounting facility disclosed in Patent Document 1 may encounter a problem that as to a workpiece having a large number of part items to be mounted, working loads on the human operators increase too much due to an increase in work mastering man-hours. Furthermore, an undue increase in the working loads will hinder the human operators from performing a highly efficient mounting operation.

PRIOR ART LITERATURE

Patent Documents

[Patent Document 1] Japanese Patent Application Laid-Open Publication (JP-A) No. 2003-251575

SUMMARY OF INVENTION

Technical Problem

An object of the present invention is to provide a part mounting facility and a part mounting method which are able to suppress working loads on the human operators even when the number of part items to be mounted to a workpiece is relatively large.

Solution to Problem

In the invention according to a first aspect, there is provided a part mounting facility for mounting parts on a workpiece carried on a workpiece conveyance dolly, comprising: conveyance paths provided in a part mounting work region; and the workpiece conveyance dolly that travels along the conveyance paths, wherein a plurality of substantially U-shaped conveyance paths having return bends is formed by providing the conveyance paths with the return bends in the part mounting work region, wherein the substantially U-shaped conveyance paths are connected to each other, and an upstream-most substantially U-shaped conveyance path among the connected substantially U-shaped conveyance paths is connected to a downstream-most substantially U-shaped conveyance path to enable the workpiece conveyance dolly to circulate along the conveyance paths.

In the invention according to a second aspect, preferably, the part mounting work region in which the plurality of substantially U-shaped conveyance paths is provided is provided in a plural number, and the part mounting facility further comprises a lift conveyance means which is capable of conveying the workpiece, carried on the workpiece conveyance dolly provided in an upstream-side part mounting work region among the plural part mounting work regions, to a workpiece conveyance dolly provided in a downstream part mounting work region.

In the invention according to a third aspect, preferably, the lift conveyance means lifts up and conveys the workpiece from the workpiece conveyance dolly provided in the upstream-side part mounting work region to the workpiece conveyance dolly provided in the downstream-side part mounting work region.

In the invention according to a fourth aspect, preferably, the workpiece is a body of an automobile, and, while the workpiece carried on the workpiece conveyance dolly provided in the upstream-side part mounting work region is lifted up and conveyed by the lift conveyance means to the workpiece conveyance dolly provided in the downstream-side part mounting work region, parts of a driving mechanism and a suspension are mounted on the workpiece.

In the invention according to a fifth aspect, preferably, a serving conveyance path provided for movement therealong of a part serving carriage is connected at opposite ends to a mounting work start position and a mounting work end position of each of the substantially U-shaped conveyance paths so that the serving carriage is allowed to move into each of the substantially U-shaped conveyance path from the mounting work start position and to be conveyed out into the serving conveyance path from the mounting work end position.

In the invention according to a sixth aspect, there is provided a part mounting method for mounting parts onto a workpiece while the workpiece is moved along conveyance paths, wherein a plurality of substantially U-shaped conveyance paths is formed by providing the conveyance paths with return bends, the method comprising the steps of: organizing a working group allotted to one workpiece moving along the substantially U-shaped conveyance paths, the working group is composed of one or more mounting operators engaged in a mounting work, beginning at a mounting work start position and ending at a mounting work end position, for mounting predetermined plural parts on the workpiece, and a plurality of extra operators; and performing the mounting work by the working group.

In the invention according to a seventh aspect, preferably, the working group further includes, additional to the mounting operator or operators, a part transporting operator for transporting a part from a part storage site to the mounting operator or operators.

Advantageous Effects of Invention

In the invention according to the first aspect, the conveyance paths are provided with the return bends to thereby form the plurality of substantially U-shaped conveyance paths having the first return bends. With this arrangement, the part items to be mounted to each workpiece can be divided and distributed to the plurality of substantially U-shaped conveyance paths. Thus, the total number of part items to be mounted in each of the substantially U-shaped conveyance paths can be reduced. Even when the number of part items to be mounted on each workpiece is large, the work load on the human operators engaged in mounting work in each of the substantially U-shaped conveyance paths can be properly suppressed.

Furthermore, the upstream-most substantially U-shaped conveyance path is connected to the downstream-most substantially U-shaped conveyance path so that the workpiece conveyance dolly is allowed to circulate along the conveyance paths. With this arrangement, when a mounting operation performed in the downstream-most substantially U-shaped conveyance path for mounting parts onto the workpiece has been completed, the workpiece is removed from the workpiece conveyance dolly and the empty or workpiece-free workpiece conveyance dolly is circulated toward the upstream-most substantially U-shaped conveyance path.

Upon arrival of the empty workpiece conveyance dolly at the upstream-most substantially U-shaped conveyance path, a new workpiece is placed on the empty workpiece conveyance dolly, and the workpiece conveyance dolly carrying thereon the workpiece is moved to advance along the upstream-most substantially U-shaped conveyance path. By thus quickly returning the workpiece conveyance dolly, which has been emptied at the downstream-most substantially U-shaped conveyance path, to the upstream-most substantially U-shaped conveyance path, it is possible to increase the productivity.

In the invention according to the second aspect, the workpiece carried on the workpiece conveyance dolly provided in the upstream-side part mounting work region is conveyed by the lift conveyance means to the workpiece conveyance dolly provided in the downstream-side part mounting work region. With this arrangement, the total number of parts to be mounted on each workpiece can be divided and distributed to the plural part mounting work regions.

With this parts distribution, it is possible to reduce the number of parts to be mounted on each workpiece in each of the part mounting work regions. Even when the number of parts to be mounted on each workpiece is large, the work load on the human operator or operators engaged in a work in each of the substantially U-shaped conveyance paths can be properly suppressed.

In the invention according to the third aspect, the workpiece carried on the workpiece conveyance dolly in the upstream-side part mounting work region is lifted up and conveyed by the lift conveyance means to the workpiece conveyance dolly provided in the downstream-side part mounting work region. With this arrangement, while the workpiece is conveyed in a lifted state, parts can be mounted on a lower portion of the workpiece. The part mounting operation can be achieved with increased efficiency and the productivity is increased.

In the invention according to the fourth aspect, the workpiece is an automobile body and the parts are mounted on the automobile body. It is known that the number of part items involved in the automobile is relatively large. By using the part mounting facility for mounting part items onto the automobile body, the work load on the human operator or operators can be properly suppressed, the part mounting operation can be achieved with increased efficiency, and the productivity is increased.

Some automobile parts, such as the driving mechanism and the suspension, are mounted on the workpiece (automobile body) from below. According to the invention, since the driving mechanism and the suspension and other lower part items can be mounted to the lower portion of the workpiece while the workpiece is conveyed in a lifted state, the operation to mount the driving mechanism and the suspension onto the workpiece can be achieved with high efficiency and, hence, the productivity is increased.

In the invention according to the fifth aspect, the serving conveyance path is connected to each of the substantially U-shaped conveyance path, and the serving carriage is movably provided on the serving conveyance path. With this arrangement, the serving carriage is allowed to move into the substantially U-shaped conveyance path from the mounting word start position and to be conveyed out into the serving conveyance path from the mounting work end position.

The serving carriage is movable along with the workpiece conveyance dolly so that the human operator or operators can speedily and easily obtain a necessary part from the serving carriage. This will further increase the mounting workability. Furthermore, the human operator or operators are freed from a time-consuming duty to walk to a part storage site and, hence, the work load on the human operator or operators can be properly suppressed.

In the invention according to the sixth aspect, one or more mounting operators are allotted to one workpiece moving along the plurality of substantially U-shaped conveyance paths having the return bends. The one or more mounting operators are engaged in the mounting work, beginning at the mounting work start position and ending at the mounting work end position, for mounting predetermined plural parts to the workpiece while the workpiece moves along each of the substantially U-shaped conveyance path.

Furthermore, a working group composed of the one or more mounting operators and a plurality of extra operators is organized and the mounting work is performed by the working group. When one of the mounting operators is not available, one of the extra operators will be engaged in the mounting work in place of the unavailable mounting operator. A desired level of part mounting workability can thus be maintained without lowering the productivity.

In the invention according to the seventh aspect, the working group further includes the part transporting operator engaged in a work for transporting a necessary part from the part storage site to the mounting operator. The mounting operator is freed from a time-consuming duty to walk to the part storage site and, hence, the work load on the mounting operator can be properly suppressed.

In general, a part transporting operation is easy to perform as compared to the part mounting operation. By properly allotting or distributing the work depending on the workability of each human operator, it is possible to efficiently use the ability of each human operator.

DESCRIPTION OF EMBODIMENTS

A certain preferred embodiment of the present invention will be described below in greater detail with reference to the accompanying sheets of drawings.

[Embodiment]

Workpiece conveyance dollies 41 are designed for accepting single or plural human operators 61 depending on the kind of workpiece 42. However, to facilitate understanding, in the embodiment shown in FIGS. 1 and 2, only one human operator 61 rides on each of the workpiece conveyance dollies 41. Furthermore, the human operator 61 is illustrated in FIGS. 1 and 2 as riding on only selected one or more workpiece conveyance dollies 41.

Figure 1:
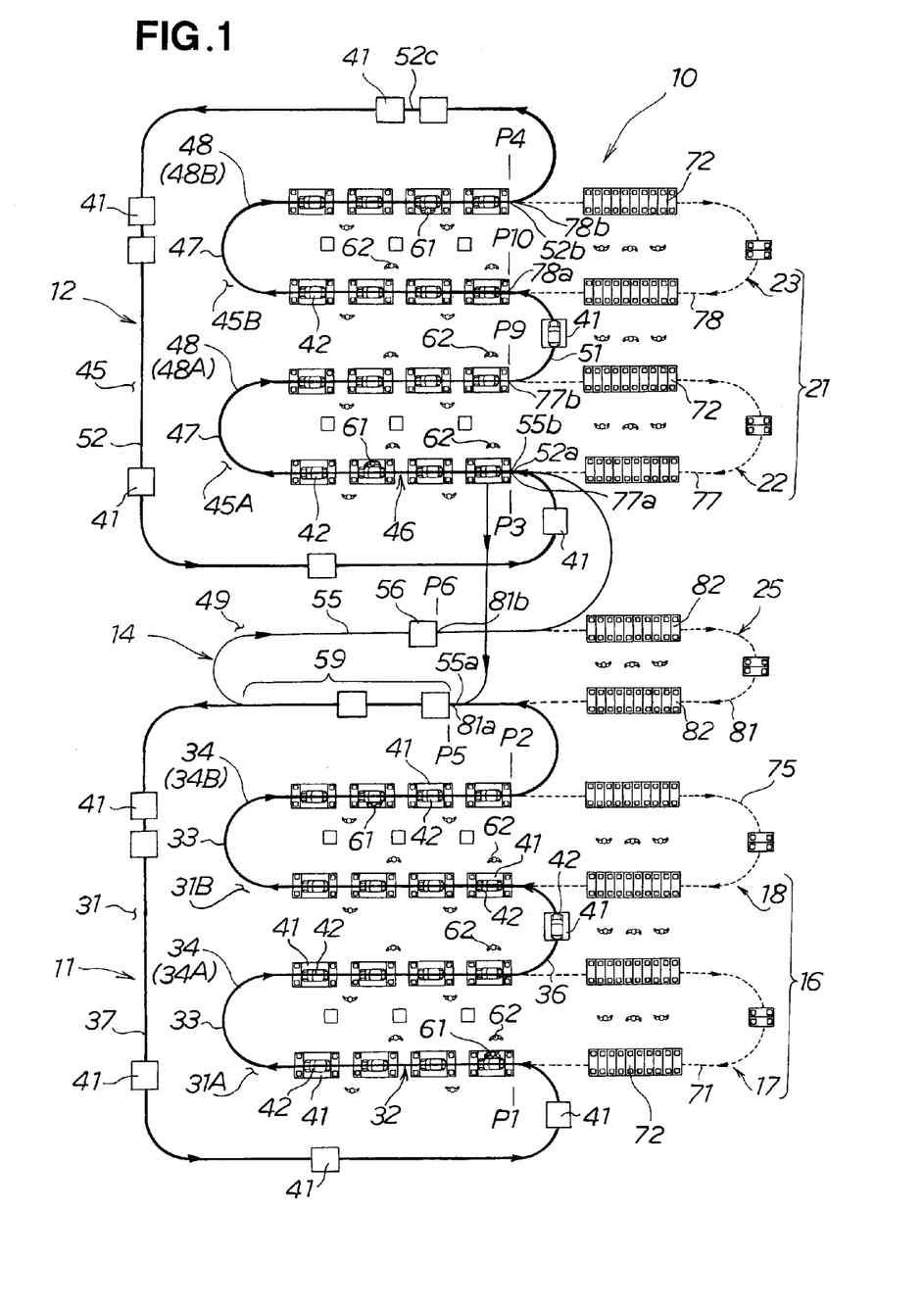
FIG. 1 is a plan view showing a part mounting facility according to the present invention.

Referring now to FIG. 1, a part mounting facility 10 generally comprises a first part mounting facility 11 provided on an upstream side, a second part mounting facility 12 provided on a downstream side of the first part mounting facility 11, and a lift conveyance means 14 provided between the first part mounting facility 11 and the second part mounting facility 12.

The part mounting facility 10 further includes a first part serving facility 16 provided adjacent to the first part mounting facility 11, a second part serving facility 21 provided adjacent to the second part mounting facility 12, and a lifter part serving facility 25 provided between the first part serving facility 16 and the second part serving facility 21.

Figure 2:
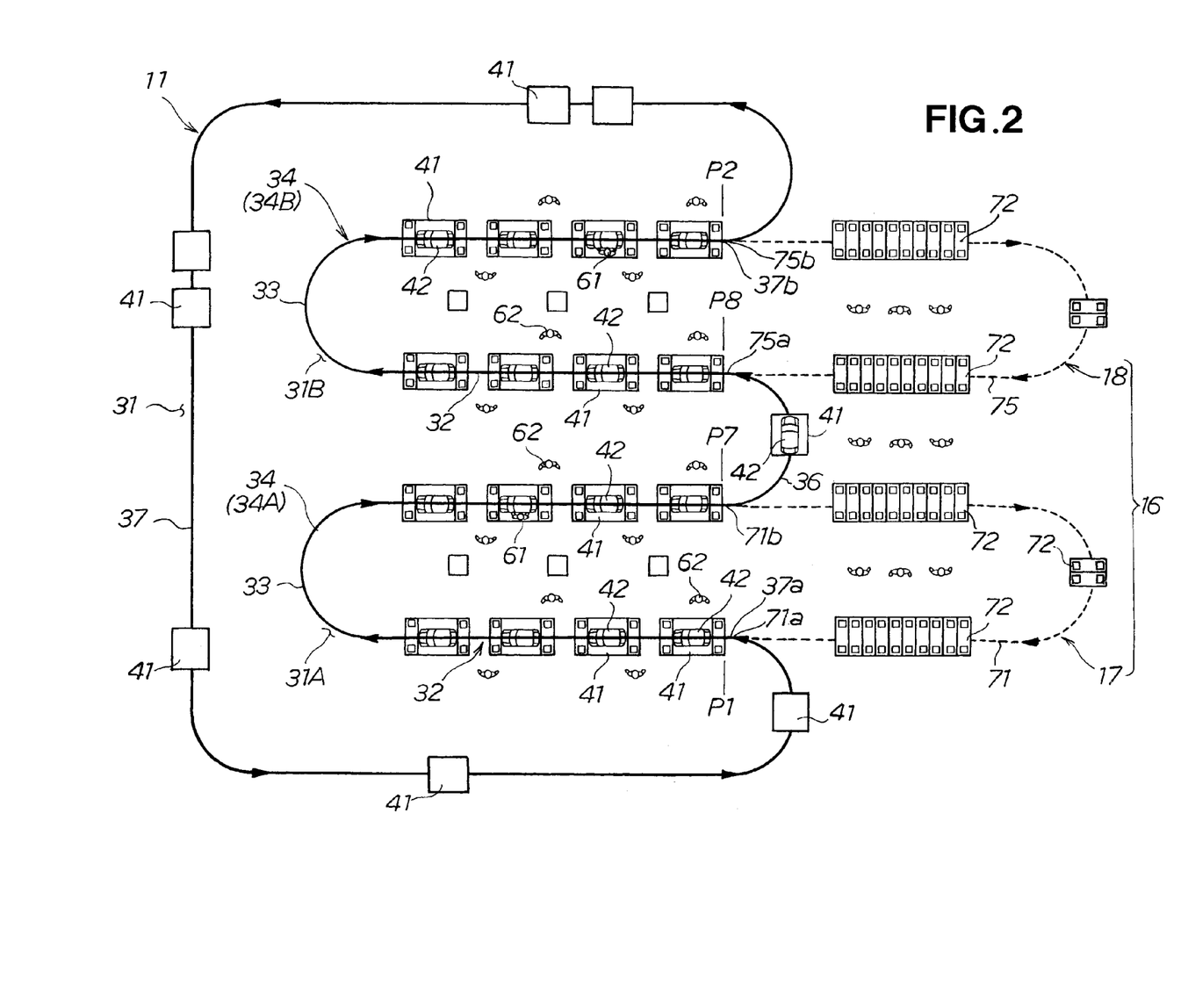
FIG. 2 is a plan view of a first part mounting work region shown in FIG. 1.

As shown in FIG. 2, the first part mounting facility 11 includes a plurality of substantially U-shaped first conveyance paths 34 having first return bends 33, which is formed by providing first conveyance paths (conveyance paths) 32 with first return bends (return bends) 33 in a first part mounting work region 31. The first return bends 33 is formed into a semicircular-arc shape.

In the first part mounting facility 11, each pair of adjacent ones of the plurality of substantially U-shaped first conveyance paths 34 is connected by a first connecting path (conveyance path) 36. The first connecting path 36 is formed into a semicircular-arc shape in the same manner as the first return bends 33.

Furthermore, in the first part mounting facility 11, an upstream-most substantially U-shaped first conveyance path 34 among the connected substantially U-shaped first conveyance paths 34 is connected to a downstream-most substantially U-shaped first conveyance path 34 by a first circulation path (conveyance path) 37. To facilitate understanding of the structure, the upstream-most substantially U-shaped first conveyance path 34 will be hereinafter designated by 34A and the downstream-most substantially U-shaped first conveyance path 34 will be hereinafter designed by 34B.

The upstream-most substantially U-shaped first conveyance path 34A is provided in a first upstream-side mounting work area 31A of the first part mounting work region 31, and the downstream-most substantially U-shaped first conveyance path 34B is provided in a first downstream-side mounting work area 31B of the first part mounting work region 31.

More specifically, one end 37a, of the first circulation path 37 is connected to a first mounting work start position P1 of the upstream-most substantially U-shaped first conveyance path 34A, and an opposite end 37b, of the first circulation path 37 is connected to a first mounting work end position P2 of the downstream-most substantially U-shaped first conveyance path 34B.

Figure 3:
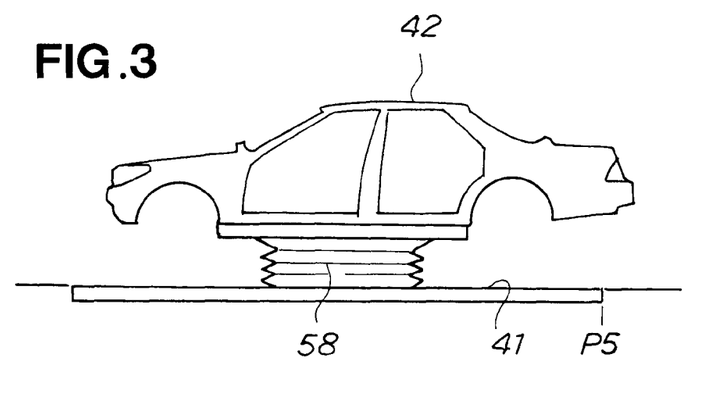
FIG. 3 is a view showing a workpiece carried on a workpiece conveyance dolly shown in FIG. 1.

The workpiece conveyance dollies 41 are provided so as to be movable along the upstream-most first conveyance path 34A, the first connecting path 36, the downstream-most first conveyance path 34B, and the first circulation path 37. Thus, the workpiece conveyance dollies 41 can be circulated along the upstream-most first conveyance path 34A, the first connecting path 36, the downstream-most first conveyance path 34B, and the first circulation path 37, as indicated by arrowheads. As shown in FIG. 3, each of the workpiece conveyance dollies 41 is provided with a lifter 58 and a workpiece (specifically, a body of an automobile) 42 is carried on the lifter 58.

On the upstream-most first conveyance path 34A shown in FIG. 2, an electric component, such as a battery for hybrid vehicles, is mounted to each individual workpiece 42. On the downstream-most first conveyance path 34B, an interior part, such as an instrument panel, and other parts are mounted to each individual workpiece 42.

In the first part mounting facility 11, each of the workpiece conveyance dollies 41 is circulated along the upstream-most first conveyance path 34A, the first connecting path 36, the downstream-most first conveyance path 34B, and the first circulation path 37. With this arrangement, after the part mounting work performed on each individual workpiece 42 is finished while the workpiece 42 is in the downstream-most substantially U-shaped conveyance path 34B, the workpiece 42 is removed from the workpiece conveyance dolly 41, and the workpiece conveyance dolly 41, which is now free from a workpiece, is circularly moved back to the upstream-most substantially U-shaped first conveyance path 34A.

Upon arrival of the workpiece-free workpiece conveyance dolly 41 at the upstream-most substantially U-shaped first conveyance path 34A, a new workpiece 41 is mounted on the workpiece-free workpiece conveyance dolly 41. The workpiece conveyance dolly 41 with the workpiece 41 carried thereon is then moved along the upstream-most substantially U-shaped first conveyance path 34A. The work conveyance dolly 41, which has become empty or free from a workpiece at the downstream-most substantially U-shaped first conveyance path 34B, can thus be quickly returned to the upstream-most substantially U-shaped first conveyance path 34A, so that the productivity can be increased.

As shown in FIG. 1, the second part mounting facility 12 is disposed downstream of the first part mounting facility 11. Likewise the first part mounting facility 11, the second part mounting facility 12 includes a plurality of substantially U-shaped second conveyance paths 46 having second return bends 47, which is formed by providing second conveyance paths (conveyance paths) 46 with first return bends (return bends) 47 in a second part mounting work region (part mounting work region) 45. The second return bends 47 is formed into a semicircular-arc shape in the same manner as the first return bends 33.

In the second part mounting facility 12, each pair of adjacent ones of the plurality of substantially U-shaped second conveyance paths 48 is connected by a second connecting path (conveyance path) 51. The second connecting path 51 is formed into a semicircular-arc shape in the same manner as the second return bends 47.

Furthermore, in the second part mounting facility 12, an upstream-most substantially U-shaped second conveyance path 48 among the connected substantially U-shaped second conveyance paths 48 is connected to a downstream-most substantially U-shaped second conveyance path 48 by a second circulation path (conveyance path) 52. To facilitate understanding of the structure, the upstream-most substantially U-shaped second conveyance path 48 will be hereinafter designated by 48A and the downstream-most substantially U-shaped second conveyance path 48 will be hereinafter designed by 48B.

The upstream-most substantially U-shaped second conveyance path 48A is provided in a second upstream-side mounting work area 45A of the second part mounting work region 45, and the downstream-most substantially U-shaped second conveyance path 48B is provided in a first downstream-side mounting work area 45B of the second part mounting work region 45.

More specifically, one end 52a, of the second circulation path 52 is connected to a second mounting work start position P3 of the upstream-most substantially U-shaped second conveyance path 48A, and an opposite end 52b, of the second circulation path 52 is connected to a second mounting work end position P4 of the downstream-most substantially U-shaped second conveyance path 48B.

The workpiece conveyance dollies 41 are provided so as to be movable along the upstream-most second conveyance path 48A, the second connecting path 51, the downstream-most second conveyance path 48B, and the second circulation path 52. Thus, the workpiece conveyance dollies 41 can be circulated along the upstream-most second conveyance path 48A, the second connecting path 51, the downstream-most second conveyance path 48B, and the second circulation path 52, as indicated by arrowheads.

On the upstream-most second conveyance path 48A, for example, an exterior part, such as a pair of headlights, and other parts are mounted to each individual workpiece 42. On the downstream-most second conveyance path 48B, for example, bumpers and other parts are mounted to each individual workpiece 42. Furthermore, at a downstream position 52c, of the downstream-most second conveyance path 48B, for example, window-panes, tires, and doors are mounted to each individual workpiece 42.

In the second part mounting facility 12, by circulating the work conveyance dollies 41 as indicated by arrowheads in the same manner as done in the first part mounting facility 11, each of the empty or workpiece-free work conveyance dollies 41 is quickly returned to the upstream-most substantially U-shaped second conveyance path 48A, so that the productivity can be increased.

In the first part mounting facility 11, the plurality of first conveyance paths 32 are provided with the plurality of first return bends 33 to thereby form the plurality of substantially U-shaped first conveyance paths 34 having the first return bends 33. Furthermore, in the second part mounting facility 12, the plurality of second conveyance paths 46 are provided with the plurality of second return bends 47 to thereby form the plurality of substantially U-shaped second conveyance paths 48 having the second return bends 47.

With this arrangement, the part items to be mounted to each workpiece 42 can be divided into two groups, one for the plurality of substantially U-shaped first conveyance paths 34 and the other for the plurality of substantially U-shaped second conveyance paths 48. Thus, the total number of part items to be mounted in the substantially U-shaped first conveyance paths 34 or the substantially U-shaped second conveyance paths 48 can be reduced. In the case where the number of part items to be mounted on each workpiece 42 is large, work load on the human operators engaged in mounting work in each of the substantially U-shaped first and second conveyance paths 34, 48 can be properly suppressed.

The lift conveyance means 14 is proved in a lift part mounting work region 49 between the first part mounting facility 11 and the second part mounting facility 12. The lift conveyance means 14 includes a lift conveyance path 55 having one end 55a, connected to a conveying-out position P5, an opposite end 55b, of the lift conveyance path 55 being connected to the second mounting work start position P3 of the second part mounting facility 12. The conveying-out position P5 is located on a downstream side of the first mounting work end position P2 of the first part mounting facility 11.

A workpiece conveyance lift 56 is movably provided on the lift conveyance path 55. The workpiece conveyance lift 56 is configured to move along the lift conveyance path 55 and, at the same time, descends to a height of the workpiece 42 where locking prongs at a lower end of the workpiece conveyance lift 56 are located below the workpiece 42.

In this condition, the workpiece conveyance lift 56 is stopped or synchronized with the movement of the workpiece 42, while at the same time, the lifter 58 (FIG. 3) of the workpiece conveyance dolly 41 moves downward to thereby allow the workpiece 42 to be set on the locking prongs. With the workpiece 42 being set on the locking prongs, the workpiece conveyance lift 56 moves upward while traveling along the lift conveyance path 55 whereby the workpiece 42 is lifted up from the workpiece conveyance dolly 41 by the workpiece conveyance lift 56. The thus lifted workpiece 42 is transferred to the workpiece conveyance dolly 41 standing-by at the second mounting work start position P3.

At the second mounting work start position P3, the aforesaid operations performed by the workpiece conveyance lift 56 to lift up the workpiece 42 from the workpiece conveyance dolly 41 are performed in a reverse manner so that the workpiece 42 is transferred from the work conveyance lift 56 to the workpiece conveyance dolly 41.

Figure 4:
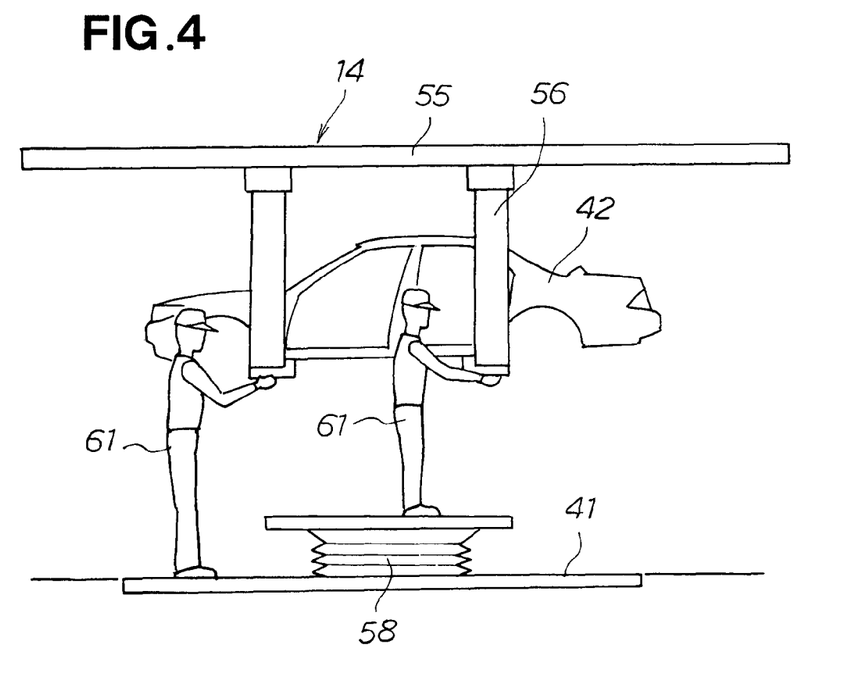
FIG. 4 is a view illustrative of the manner in which parts are mounted to the workpiece from below while the workpiece is lifted up by a lift conveyance means shown in FIG. 1.
Figure 5:
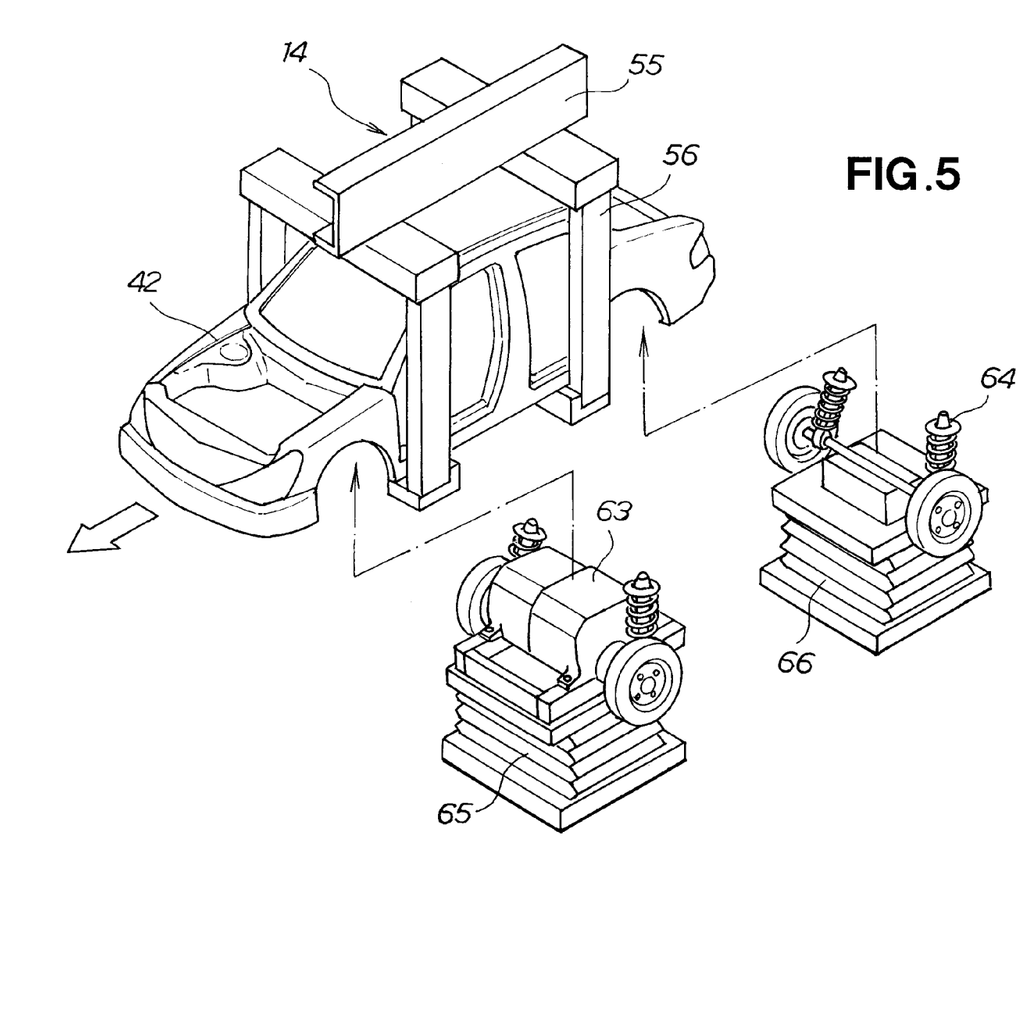
FIG. 5 is a perspective view illustrative of the manner in which an engine unit and other parts are mounted to the workpiece while the workpiece is lifted up by the lift conveyance means shown in FIG. 1.

As shown in FIGS. 4 and 5, the workpiece 42 is lifted up by the workpiece conveyance lift 56 and, thereafter, at a lower part mounting region 59 disposed downstream of the conveying-out position P5 (FIG. 1), lower parts (such as connecting joints for driving) excluding an engine unit 63 and a rear suspension 64 are mounted on the workpiece 42 from below.

During that time, depending on the position on the workpiece 42 where a lower part is to be mounted, it may be convenient for a human operator 61 to perform a mounting operation while standing on the lifter 58 of the workpiece conveyance dolly 41. The human operator 61 is allowed to perform the mounting operation without taking an unusual posture and, hence, the work load on the human operator 61 can be reduced.

In the embodiment shown in FIGS. 1 and 2, only one human operator 61 mounts on each of the selected workpiece conveyance dollies 41 in order to facilitate understanding. However, two or more human operators 61 may ride on the workpiece conveyance dolly 41 to perform the mounting operation.

As shown in FIG. 4, after the lower parts are mounted on the workpiece 42, the workpiece 42 is transport to an engine mounting position P6 (FIG. 1). As shown in FIG. 5, at the engine mounting position P5, the engine unit 63 and the rear suspension 64 are lifted up by two lifters 65 and 66, respectively. While keeping this condition, the engine unit 63 and the rear suspension 64 are mounted on the workpiece 42 from below. The engine unit 63 includes an engine, a transmission and a clutch that are integrated into a unitary structure, and a front suspension integrally formed with the unitary structure.

Since the lift conveyance means 14 lifts up and carries the workpiece 42 from the workpiece conveyance dolly 41 in the first part mounting facility 11 to the workpiece conveyance dolly 41 in the second part mounting facility 12, the lower parts, the engine unit 63 and the rear suspension 64 can be mounted to a lower portion of the workpiece 42 during conveyance of the workpiece 42 by the lift conveyance means 41. This arrangement increases the efficiency of the part mounting operation relative to the workpiece 42 and improves the productivity.

Furthermore, since the workpiece 42 carried on the workpiece conveyance dolly 41 in the first part mounting facility 11 can be transported by the lift conveyance means 14 to the workpiece conveyance dolly 41 in the second part mounting facility 12, the part items to be mounted to each workpiece 42 are divided and distributed to the first part mounting facility 11 and the second part mounting facility 12.

By thus allocating the part items, it is possible to reduce the number of parts to be mounted on each workpiece 42 in the first part mounting facility 11 or the second part mounting facility 12. In the case where the number of parts to be mounted on each individual workpiece 42 is relatively large, the work load on the human operators engaged in mounting work in the first part mounting facility 11 or the second part mounting facility 12 can be properly suppressed.

As shown in FIG. 2, the first part serving facility 16 is disposed adjacent to the first part mounting facility 11. The first part serving facility 16 includes an upstream-side first part serving section 17, and a downstream-side first part serving section 18 disposed on a downstream side of the upstream-side first part serving section 17.

The upstream-side first part serving section 17 includes an upstream-side first serving conveyance path (serving conveyance path) 71 having one end 71*a*, connected to the first mounting work start position P1 of the upstream-most first conveyance path 34A of the first part mounting facility 11, an opposite end 71*b*, of the upstream-side first serving conveyance path 71 being connected to a first mounting work end position P7 of the upstream-most first conveyance path 34A of the first part mounting facility 11.

Serving carriages 72 are movably provided on the upstream-side first serving conveyance path 71 so that the serving carriages 72 can be transported onto the upstream-most substantially U-shaped first conveyance path 34A from the first mounting work start position P1 and, thereafter, the serving carriages 72 can be conveyed out from the first mounting work end position P7 of the upstream-most substantially U-shaped first conveyance path 34A onto the upstream-side first serving path 71.

Figure 6:
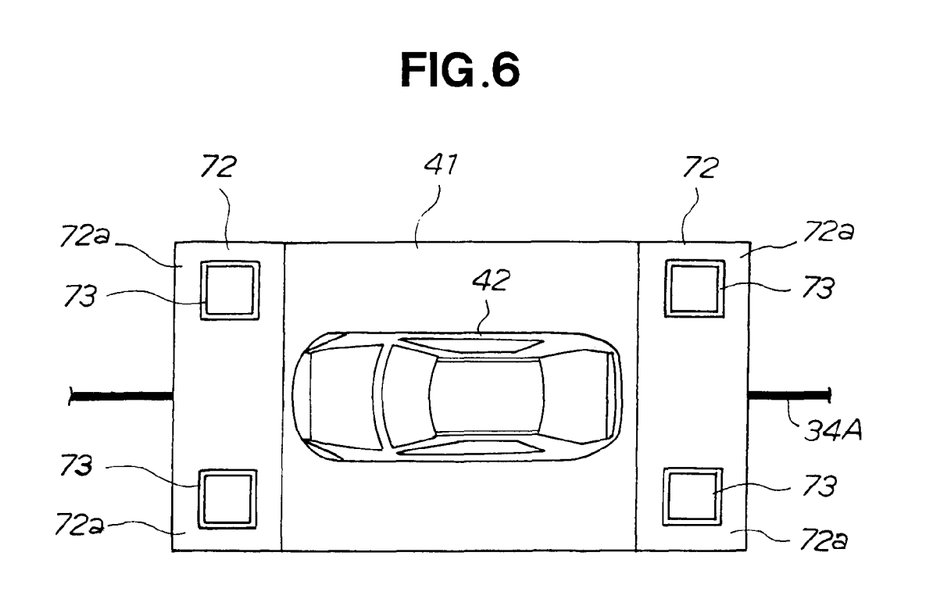
FIG. 6 is a plan view illustrative of the manner in which serving dollies are transported together with a workpiece conveyance dolly according to the invention.

As shown in FIG. 6, in the upstream-most substantially U-shaped first conveyance path 34A, two serving carriages 72 are placed in front and behind each of the workpiece conveyance dollies 41 and the serving carriages 72 are movable along with each workpiece conveyance dolly 41. Each of the serving carriages 72 has two parts storage boxes 73 at opposite lateral ends 72*a*, thereof for storing therein parts to be mounted to each individual workpiece 42.

This arrangement allows the human operator 61 (FIG. 1) to quickly pick up a necessary part to be mounted on the workpiece 42, which will further increase the assembly workability. Furthermore, the human operator 61 is now freed from a time-consuming duty to walk to a part storage site and, hence, the work load on the human operator 61 can be properly suppressed.

Referring back to FIG. 2, the downstream-side first part serving section 18 includes a downstream-side first serving conveyance path (serving conveyance path) 75 having one end 75*a*, connected to a first mounting work start position P8 of the downstream-most first conveyance path 34B of the first part mounting facility 11, an opposite end 75*b*, of the downstream-side first serving conveyance path 75 being connected to the first mounting work end position P2 of the downstream-most first conveyance path 34B of the first part mounting facility 11.

Serving carriages 72 are movably provided on the downstream-side first serving conveyance path 75 so that the serving carriages 72 can be transported onto the downstream-most substantially U-shaped first conveyance path 34B from the first mounting work start position P8 and, thereafter, the serving carriages 72 can be conveyed out from the first mounting work end position P2 of the downstream-most substantially U-shaped first conveyance path 34B onto the downstream-side first serving path 75.

With this arrangement, in the downstream-most substantially U-shaped first conveyance path 34B, two of the serving carriages 72 can be moved along with each of the workpiece conveyance dollies 41, so that the human operator 61 is allowed to quickly pick up a necessary part to be mounted on the workpiece 42. This will further increase the assembly workability. Furthermore, the human operator 61 is freed from a time-consuming duty to walk to the part storage site and, hence, the work load on the human operator 61 can be properly suppressed.

As shown in FIG. 1, the second part serving facility 21 is provided adjacent to the second part mounting facility 12. The second part serving facility 21 includes an upstream-side second part serving section 22 and a downstream-side second part serving section 23 disposed on a downstream side of the upstream-side second part serving section 22.

The upstream-side second part serving section 22 includes an upstream-side second serving conveyance path (serving conveyance path) 77 having one end 77*a*, connected to the second mounting work start position P3 of the upstream-most second conveyance path 48A of the second part mounting facility 12, an opposite end 77*b*, of the upstream-side second serving conveyance path 77 being connected to a second mounting work end position P9 of the upstream-most second conveyance path 48A of the second part mounting facility 12.

Serving carriages 72 are movably provided on the upstream-side second serving conveyance path 77 so that the serving carriages 72 can be transported onto the upstream-most substantially U-shaped second conveyance path 48A from the second mounting work start position P3 and, thereafter, the serving carriages 72 can be conveyed out from the second mounting work end position P9 of the upstream-most substantially U-shaped second conveyance path 48A onto the upstream-side second serving path 77.

With this arrangement, in the upstream-most substantially U-shaped second conveyance path 48A, two of the serving carriages 72 are movable along with each workpiece conveyance dolly 41. The human operator 61 is allowed to quickly pick up a necessary part to be mounted on the workpiece 42, which will further increase the assembly workability. Furthermore, the human operator 61 is freed from a time-consuming duty to walk to the part storage site and, hence, the work load on the human operator 61 can be properly suppressed.

The downstream-side second part serving section 23 includes a downstream-side second serving conveyance path (serving conveyance path) 78 having one end 78*a*, connected to a second mounting work start position P10 of the downstream-most second conveyance path 48B of the second part mounting facility 12, an opposite end 78*b*, of the downstream-side second serving conveyance path 78 being connected to the second mounting work end position P4 of the downstream-most second conveyance path 48B of the second part mounting facility 12.

Serving carriages 72 are movably provided on the downstream-side second serving conveyance path 78 so that the serving carriages 72 can be transported onto the downstream-most substantially U-shaped second conveyance path 48B from the second mounting work start position P10 and, thereafter, the serving carriages 72 can be conveyed out from the second mounting work end position P4 of the downstream-most substantially U-shaped second conveyance path 48B onto the downstream-side second serving path 77.

With this arrangement, in the downstream-most substantially U-shaped second conveyance path 48B, two of the serving carriages 72 can be moved along with each of the workpiece conveyance dollies 41, so that the human operator 61 is allowed to quickly pick up a necessary part to be mounted on the workpiece 42. This will further increase the assembly workability. Furthermore, the human operator 61 is freed from a time-consuming duty to walk to the part storage site and, hence, the work load on the human operator 61 can be properly suppressed.

The lifter part serving facility 25 is provided adjacent to the lifter conveyance means 14. The lifter part serving facility 25 includes a lift serving conveyance path (serving conveyance path) 81 having one end 81a, connected to the conveying-out position P5. The conveying-out position P5 is connected to the lift conveyance path 55 of the lift conveyance means 14. An opposite end 81b, of the lift serving conveyance path 81 is connected to the lift conveyance path 55 at the engine mounting position P6.

Serving carriages 82 are movably provided on the lift serving conveyance path 81 so that the serving carriages 82 can be transported onto the lift conveyance path 55 from the conveying-out position P5 and, thereafter, the serving carriages 82 can be moved out from the lift conveyance path 55 at the engine mounting position P6 and transferred onto the lift serving conveyance path 81. The serving carriages 82 can thus be moved along with the individual workpieces 42 by using the workpiece conveyance lift 56.

Furthermore, in the illustrated embodiment, the workpiece 42 is a body of an automobile and the part mounting facility 10 are arranged to mount automobile parts to the body of the automobile. It is known that the number of part items of the automobile is relatively large. The part mounting facility 10 is used for mounting part items onto an automobile body to thereby suppress the work load on the human operators 61 and insure a highly efficient part mounting operation and increased productivity.

Some automobile parts, such as the engine unit (driving mechanism) 63 and the rear suspension (suspension) 64 (FIG. 5), are mounted on the automobile body from below. According to the invention, since the engine unit 63, the rear suspension 64 and other lower part items can be mounted to a lower portion of the workpiece 42 while the workpiece 42 is conveyed in a lifted state, the operation to mount the engine unit 63, the rear suspension 64 and the lower part item to the workpiece 42 can be achieved with high efficiency and, hence, the productivity is increased.

A part mounting method of the invention that can be carried out by the part mounting facility 10 will be described with reference to FIG. 7. The workpiece conveyance dollies 41 are designed for accepting single or plural human operators 61 depending on the kind of workpiece 42. However, to facilitate understanding, in the embodiment shown in FIG. 7, only one human operator 61 rides on each of the workpiece conveyance dollies 41. Furthermore, the human operator 61 is illustrated in FIG. 7 as riding on only selected one or more workpiece conveyance dollies 41.

Figure 7:
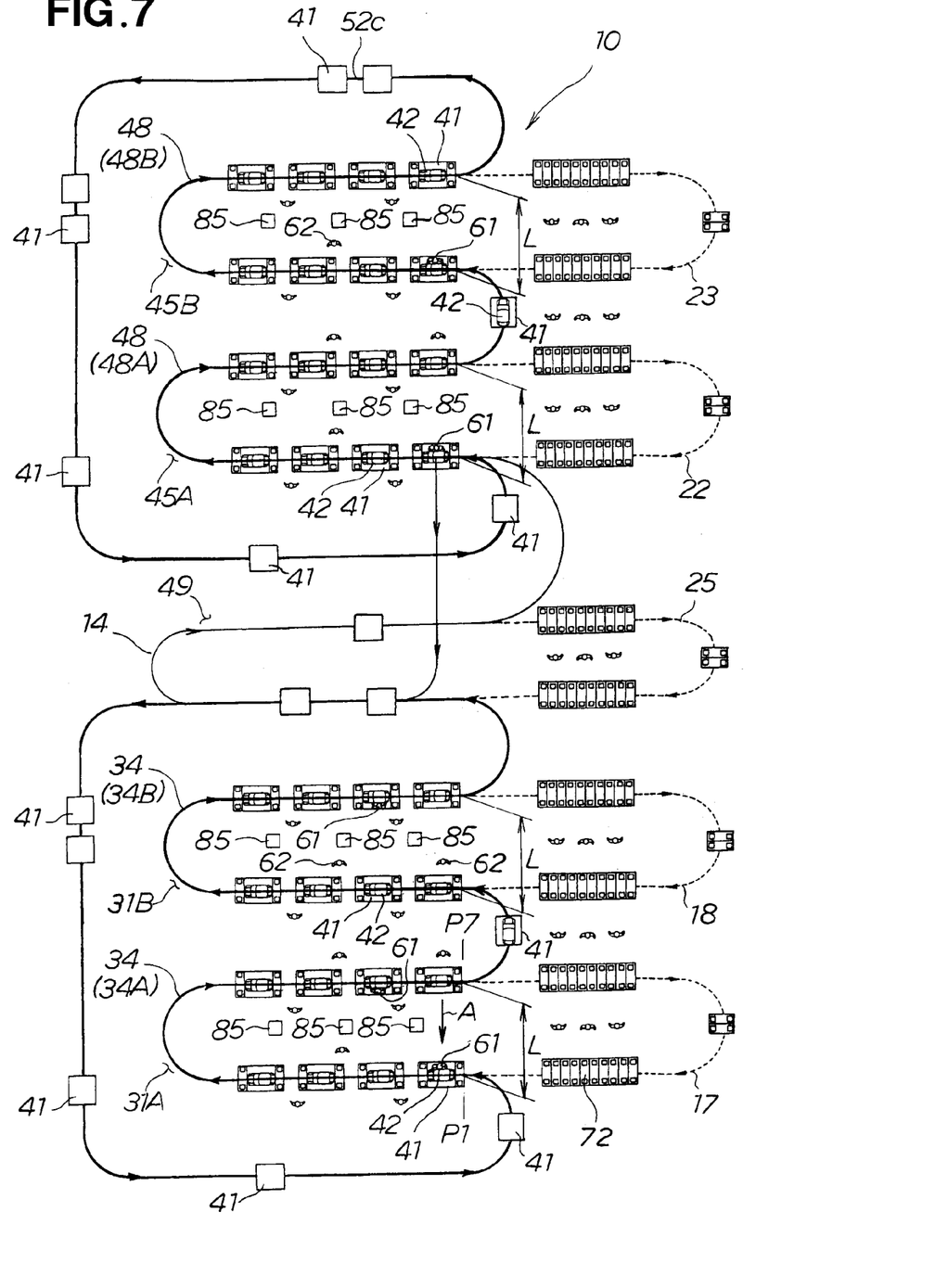
FIG. 7 is a plan view showing a part mounting method according to the present invention.

As shown in FIG. 7, the part mounting facility 10 includes the upstream-most substantially U-shaped first conveyance path 34A provided in the first upstream-side mounting work area 31A. The upstream-side first part serving section 17 is provided adjacent to the first conveyance path 34A. Furthermore, the downstream-most first conveyance path 34B is provided in the first downstream-side mounting work area 31B, and the downstream-side first part serving section 18 is provided adjacent to the first conveyance path 34B.

Similarly, the upstream-most substantially U-shaped second conveyance path 48A is provided in the second upstream-side mounting work area 45A. The upstream-side second part serving section 22 is provided adjacent to the second conveyance path 48A. Furthermore, the downstream-most second conveyance path 48B is provided in the second downstream-side mounting work area 45B, and the downstream-side second part serving section 23 is provided adjacent to the second conveyance path 48B. The lift conveyance means 14 is provided in the lift part mounting work region 49, and the lifter part serving facility 25 is provided adjacent to the lift conveyance means 14.

In the part mounting facility 10, the workpiece conveyance dollies 41 are travelling one after another from an upstream side toward a downstream side along the upstream-most first conveyance path 34A, the downstream-most first conveyance path 34B, the upstream-most second conveyance path 48A, and the downstream-most second conveyance path 48B.

When each workpiece conveyance dolly 41 moves from the first mounting start position P1 into the first conveyance path 34a, one workpiece 42 is placed on the workpiece conveyance dolly 41. At the same time, one or more human operators 61 ride on the workpiece conveyance dolly 41 for achieving necessary part mounting operations. Likewise, for each of the workpiece conveyance dollies 41 coming in sequence from the upstream side into the first mounting work start position P1, one workpiece 42 is placed on the workpiece conveyance dolly 41 and one or more human operators 61 ride on the same workpiece conveyance dolly 41. The human operator or operators 61 engage in a work to mount parts to the workpiece 42.

More specifically, in the first upstream-side mounting work area 31A, electric parts, such as a battery for hybrid vehicles, are mounted on the workpiece (automobile body). In the first conveyance path 34A, two serving carriages 72 are provided at the front and behind each workpiece conveyance dolly 41 and the serving carriages 72 are moved along with the workpiece conveyance dolly 41.

While the workpiece conveyance dolly 41 advances along the first conveyance path 34A from the first mounting work start position P1 to the first mounting work end position P7, the electric parts, such as the battery for hybrid vehicles, are mounted on the workpiece 42 by the human operator or operators 61 while moving along with the workpiece conveyance dolly 41. Since the parts to be mounted on the workpiece 42 are carried on the serving carriages 72 moving along with the workpiece conveyance dolly 41, the part mounting operation can be achieved with increased efficiency.

Those parts (small parts, for example), which are not carried on the serving carriages 72, are stored in parts storage boxes 85 provided in the first upstream-side mounting work area 31A, so that a human operator 61 engaged exclusively in part serving work serves the parts from the parts storage boxes 85 onto the workpiece conveyance dolly 41. By thus serving the small parts, the efficiency of the part mounting operation is further increased. When the workpiece conveyance dolly 41 arrives at the first mounting work end position P7 and the part mounting work for the workpiece 42 has been completed, the human operator or operators 61 return to the first mounting work start position P1 as indicated by the arrow A. In this instance, because the first conveyance path 34A is substantially U-shaped, the distance L between the first mounting work end position P7 and the first mounting work start position P1 can be made relatively short. This will allow the human operator or operators 61 to cut down its or their traveling distance required when returning to the first mounting work start position P1. The work load on the human operator or operators can be reduced and the productivity is increased.

In a like manner as done in the first conveyance path 34a, in the first upstream-side mounting work area 31A, interior parts, such as an instrument panel, and other part items are mounted on the workpiece 42 in the downstream-most first convenience path 34B, and lower parts, an engine unit 63 (FIG. 5) and a rear suspension 64 are mounted on a lower portion of the workpiece 42 in the lift conveyance means 14.

Subsequently, in the upstream-most second conveyance path 48A, exterior parts, such as headlights, and other parts are mounted on the workpiece 42. Similarly, in the downstream-most second conveyance path 48B, bumpers and other parts are mounted on the workpiece 42.

Finally, at the position 52c, located downstream of the downstream-most second conveyance path 48B, windowpanes, tires, door and other parts are mounted on the workpiece to thereby complete the part mounting work for the workpiece (automobile body) 42.

As described above, one human operator 61 is allocated to each workpiece conveyance dolly 41 as the workpiece conveyance dolly 41 moves along the upstream-most first conveyance path 34A, the downstream-most first conveyance path 34B, the lift conveyance means 14, the upstream-most second conveyance path 48A, and the downstream-most second conveyance path 48B. While one workpiece 42 carried on each workpiece conveyance dolly 41 advances successively along the substantially U-shaped conveyance paths 34A, 34B, 48A and 48B, the allocated human operator 61 perform a part mounting operation to mount predetermined plural parts onto the workpiece 42, beginning at each of the mounting work start position and ending at the corresponding mounting work end position.

In the embodiment shown in FIG. 7, one human operator 61 is allocated to each workpiece 42. This embodiment is not restrictive and two or more human operators 61 may be allocated to each workpiece 42.

A working group for the substantially U-shaped conveyance paths 34a, 34B, 48A and 48B is formed or organized by one or plural human operators 61 engaged in a part mounting work for mounting predetermined plural parts on each workpiece 42, and a plurality of additional or extra human operators. In the case where one of the human operators 61 is not available, one of the extra human operators in the working group will engage in the part mounting work in place of the unavailable human operator 61. Thus, a desired level of mounting workability can be maintained without lowering the productivity.

The working group also includes a plurality of part transporting operators 62 in addition to the human operators 61 engaged in the part mounting work. The operators 61 will be hereinafter referred to as "mounting operators". The part transporting operators 62 serve to transport necessary parts from the part storage boxes (the part storage sites) 85 to the mounting operators 61. There is no need for the mounting operators 61 to walk to the part storage site for getting the necessary part. The work load on the mounting operators 61 can thus be properly suppressed.

In general, a part transporting operation performed to transport parts to the mounting operators 61 is easier than a part mounting operation performed to mount parts on the workpiece 42. By properly allotting or distributing the work depending on the workability of each human operator 61, 62, it is possible to efficiently use the ability of each human operator 61, 62.

The present invention should by no means be limited to the illustrated embodiment, but various changes and modifications are possible. For example, the shapes and configurations of the part mounting facility 10, the lift conveyance means 14, the first conveyance paths 32, the first return bends (return bends) 33, the substantially U-shaped first conveyance paths 34 (34A, 34B), the workpiece conveyance dollies 41, the workpiece 42, the second conveyance paths 46, the second return bends 47, the substantially U-shaped second conveyance paths 48 (48A, 48B), the serving carriages 72, 82, the first serving conveyance paths 72, 75, the second serving conveyance paths 77, 78, and the lift serving conveyance path 81 are not limited to those described above with respect to the illustrated embodiment, but various changes and modifications are possible.

Industrial Applicability

With the arrangements so far described, the present invention is particularly suitable for application in a part mounting facility and a part mounting method wherein parts are mounted on each workpiece carried on a workpiece conveyance dolly while the dolly is moved along a conveyance path.

REFERENCE SIGNS LIST

10: part mounting facility
14: lift conveyance means
31: first part mounting work region (part mounting work region)
31A: first upstream-side mounting work area
31B: first downstream-side mounting work area
32: first conveyance path (conveyance path)
33: first return bend (return bend)
34 (34A, 34B): substantially U-shaped first conveyance path (conveyance path)
36: first connecting path (conveyance path)
37: first circulation path (conveyance path)
41: workpiece conveyance dolly
42: workpiece
45: second part mounting work region (part mounting work region)
46: second conveyance path (conveyance path)
47: second return bend (return bend)
48 (48A, 48B): substantially U-shaped second conveyance path (conveyance path)
51: second connecting path (conveyance path)
52: second circulation path (conveyance path)
72, 82: serving carriage
71, 75: first serving conveyance path (serving conveyance path)
77, 78: second serving conveyance path (serving conveyance path)
81: lift serving conveyance path (serving conveyance path)

The invention claimed is:

1. A part mounting facility for mounting parts on a workpiece carried on a workpiece conveyance dolly, comprising:
conveyance paths provided in a part mounting work region; and
the workpiece conveyance dolly that travels along the conveyance paths,
wherein a plurality of substantially U-shaped conveyance paths having return bends is formed by providing the conveyance paths with the return bends in the part mounting work region,
wherein the substantially U-shaped conveyance paths are connected to each other, and an upstream-most substantially U-shaped conveyance path among the connected substantially U-shaped conveyance paths is connected to a downstream-most substantially U-shaped conveyance path to enable the workpiece conveyance dolly to circulate along the conveyance paths, and wherein a serving conveyance path provided for movement therealong of a part serving carriage is connected at opposite ends to a mounting work start position and a mounting work end position of each of the substantially U-shaped conveyance paths so that the serving carriage is allowed to move into each of the substantially U-shaped conveyance paths from the mounting work start position and to be conveyed out into the serving conveyance path from the mounting work end position.

2. The part mounting facility as defined in claim 1, wherein the part mounting work region in which the plurality of substantially U-shaped conveyance paths is provided is provided in a plural number, and wherein the part mounting facility further comprises a lift conveyance means which is capable of conveying the workpiece, carried on the workpiece conveyance dolly provided in an upstream-side part mounting work region among the plural part mounting work regions, to a workpiece conveyance dolly provided in a downstream part mounting work region.

3. The part mounting facility as defined in claim 2, wherein the lift conveyance means lifts up and conveys the workpiece from the workpiece conveyance dolly provided in the upstream-side part mounting work region to the workpiece conveyance dolly provided in the downstream-side part mounting work region.

4. The part mounting facility as defined in claim 2, for use with the workpiece consisting of a body of an automobile, and, while the workpiece carried on the workpiece conveyance dolly provided in the upstream-side part mounting work region is lifted up and conveyed by the lift conveyance means to the workpiece conveyance dolly provided in the downstream-side part mounting work region, parts of a driving mechanism and a suspension are mounted on the workpiece.

5. A part mounting method for mounting parts onto a workpiece carried on a workpiece conveyance dolly while the workpiece conveyance dolly carrying thereon the workpiece is moved along conveyance paths, wherein a plurality of substantially U-shaped conveyance paths is formed by providing the conveyance paths with return bends, each of the substantially U-shaped conveyance paths has a mounting work start position located at an upstream end thereof and a mounting work end position located at a downstream end thereof, the method comprising the steps of:

providing a serving conveyance path for movement therealong of part serving carriages, the serving conveyance path being connected at opposite ends to the mounting work start position and the mounting work end position of each of the substantially U-shaped conveyance paths so that the serving carriages are allowed to move into each of the substantially U-shaped conveyance paths from the mounting work start position and to be conveyed out into the serving conveyance path from the mounting work end position, organizing a working group allotted to one workpiece carried on the workpiece conveyance dolly and moving along the substantially U-shaped conveyance paths, the working group is composed of one or more mounting operators engaged in a mounting work, beginning at the mounting work start position and ending at the mounting work end position of each of the substantially U-shaped conveyance paths, for mounting predetermined plural parts on the workpiece; and performing the mounting work by the working group in such a manner that two of the part serving carriages are placed in front and behind the workpiece conveyance dolly at the mounting work start position to thereby allow the two part serving carriages to move along with the workpiece conveyance dolly, and when the workpiece conveyance dolly arrives at the mounting work end position and the mounting work for the workpiece carried on the workpiece conveyance dolly has been completed, the mounting operator or operators return to the mounting work start position.

6. The part mounting method as defined in claim 5, wherein the working group further includes, additional to the mounting operator or operators, a part transporting operator for transporting a part from a part storage site to the mounting operator or operators.

* * * * *